(12) United States Patent
Wang et al.

(10) Patent No.: US 11,251,443 B2
(45) Date of Patent: Feb. 15, 2022

(54) FUEL CELL SYSTEM, OPERATING METHOD THEREOF AND FUEL CELL POWER PLANT

(71) Applicant: Cummins Enterprise LLC, Indianapolis, IN (US)

(72) Inventors: Honggang Wang, ShangHai (CN); Andrew Philip Shapiro, Malta, NY (US); Patrick Hammel Hart, Malta, NY (US); Xiangdong Kong, ShangHai (CN); Ralph Teichmann, Malta, NY (US)

(73) Assignee: Cummins Enterprise, LLC, Indianapolis, IN (US)

( * ) Notice: Subject to any disclaimer, the term of this patent is extended or adjusted under 35 U.S.C. 154(b) by 707 days.

(21) Appl. No.: 15/379,342

(22) Filed: Dec. 14, 2016

(65) Prior Publication Data
US 2017/0179503 A1 Jun. 22, 2017

(30) Foreign Application Priority Data
Dec. 18, 2015 (CN) .......................... 201510962881.X (51) Int. Cl.
*H01M 8/04* (2016.01)
*H01M 8/06* (2016.01)
(Continued)

(52) U.S. Cl.
CPC ....... *H01M 8/04097* (2013.01); *H01M 8/045* (2013.01); *H01M 8/0438* (2013.01);
(Continued)

(58) Field of Classification Search
None
See application file for complete search history.

(56) References Cited

U.S. PATENT DOCUMENTS 5,075,277 A 12/1991 Saiai et al.
6,884,533 B2 4/2005 Stocker
(Continued)

FOREIGN PATENT DOCUMENTS

CN 102751521 10/2012
EP 0 401 834 A1 12/1990
(Continued)

OTHER PUBLICATIONS

Assabumrungrat, S., et al., "Thermodynamic analysis of carbon formation in a solid oxide fuel cell with a direct internal reformer fuelled by methanol," Journal of Power Sources, vol. 139, Issue 1-2 pp. 55-60 (Jan. 4, 2005).
(Continued)

*Primary Examiner* — Barbara L Gilliam
*Assistant Examiner* — Angela J Martin
(74) *Attorney, Agent, or Firm* — Barnes & Thornburg LLP (57) ABSTRACT

A fuel cell system is disclosed, which includes an anode recirculation loop having a fuel cell stack for generating power, a flowmeter, a current sensor and a processor. The flowmeter is configured for measuring a fuel flow rate provided into the anode recirculation loop. The current sensor is configured for measuring a current drawn from the fuel cell stack. The processor is configured for determining a steam to carbon ratio in the anode recirculation loop based on the measured fuel flow rate and the measured current. The fuel cell system further includes a temperature sensor for measuring a temperature in the anode recirculation loop. The process is configured for determining the steam to carbon ration further based on the measured temperature. A method for operating the fuel cell system and a fuel cell power plant are also disclosed.

22 Claims, 5 Drawing Sheets

(51) Int. Cl.

| | | |
|---|---|---|
| *H01M 8/24* | (2016.01) | |
| *H01M 8/04089* | (2016.01) | |
| *H01M 8/04492* | (2016.01) | |
| *H01M 8/0438* | (2016.01) | |
| *H01M 8/04858* | (2016.01) | |
| *H01M 8/0612* | (2016.01) | |
| *H01M 8/0432* | (2016.01) | |
| *H01M 8/04537* | (2016.01) | |
| *H01M 8/0444* | (2016.01) | |
| *H01M 8/04746* | (2016.01) | |
| *H01M 8/04992* | (2016.01) | |
| *H01M 8/0637* | (2016.01) | |
| *H01M 8/124* | (2016.01) | |

(52) U.S. Cl.
CPC ..... *H01M 8/0491* (2013.01); *H01M 8/04328* (2013.01); *H01M 8/04373* (2013.01); *H01M 8/04388* (2013.01); *H01M 8/04447* (2013.01); *H01M 8/04462* (2013.01); *H01M 8/04514* (2013.01); *H01M 8/04574* (2013.01); *H01M 8/04589* (2013.01); *H01M 8/04753* (2013.01); *H01M 8/04992* (2013.01); *H01M 8/0612* (2013.01); *H01M 8/0618* (2013.01); *H01M 8/24* (2013.01); *H01M 8/0637* (2013.01); *H01M 2008/1293* (2013.01); *H01M 2250/10* (2013.01); *Y02B 90/10* (2013.01); *Y02E 60/50* (2013.01)

(56) References Cited

U.S. PATENT DOCUMENTS

| | | | |
|---|---|---|---|
| 7,455,923 | B2 | 11/2008 | Katikaneni et al. |
| 7,632,596 | B2 | 12/2009 | Al-Qattan et al. |
| 7,651,800 | B2 | 1/2010 | Kadowaki et al. |
| 7,727,419 | B2 | 6/2010 | Dalla Betta et al. |
| 7,993,708 | B2 | 8/2011 | Evans et al. |
| 8,197,978 | B2 | 6/2012 | Ballantine et al. |
| 8,227,125 | B2 | 7/2012 | Heo et al. |
| 8,574,775 | B2 | 11/2013 | Hatada |
| 8,685,583 | B2 | 4/2014 | Weingaertner et al. |
| 8,778,556 | B2 | 7/2014 | Leah et al. |
| 8,968,432 | B2 | 3/2015 | Whyatt et al. |
| 8,968,955 | B2 | 3/2015 | Weingaertner et al. |
| 9,093,674 | B2 | 7/2015 | Barnard et al. |
| 2002/0192136 | A1 | 12/2002 | Baumann et al. |
| 2006/0099467 | A1 | 5/2006 | Cutright et al. |
| 2006/0204412 | A1 | 9/2006 | Rizzo et al. |
| 2008/0057359 | A1* | 3/2008 | Venkataraman .. H01M 8/04089 429/423 |
| 2008/0092830 | A1 | 4/2008 | Suzuki |
| 2008/0154558 | A1 | 6/2008 | Zhou |
| 2009/0142631 | A1 | 6/2009 | Kah |
| 2009/0280360 | A1 | 11/2009 | Weingaertner et al. |
| 2010/0047637 | A1 | 2/2010 | McElroy et al. |
| 2010/0216039 | A1 | 8/2010 | Jahnke et al. |
| 2010/0239924 | A1 | 9/2010 | McElroy et al. |
| 2011/0165486 | A1 | 7/2011 | Hottinen et al. |
| 2012/0064422 | A1 | 3/2012 | Takeuchi et al. |
| 2012/0208099 | A1 | 8/2012 | Chen et al. |
| 2013/0118077 | A1 | 5/2013 | Lines et al. |
| 2013/0118735 | A1 | 5/2013 | Jamal et al. |
| 2014/0051000 | A1 | 2/2014 | Ogawa et al. |

FOREIGN PATENT DOCUMENTS

| | | |
|---|---|---|
| EP | 1 228 547 A1 | 8/2002 |
| EP | 2 477 266 A2 | 7/2012 |
| JP | 2005015318 A | 1/2005 |
| JP | 2006260874 A | 9/2006 |
| JP | 2007-091542 A | 4/2007 |
| JP | 2008525302 A | 7/2008 |
| JP | 2010135194 A | 6/2010 |
| JP | 2010212107 A | 9/2010 |
| JP | 2012500462 A | 1/2012 |
| JP | 2013-187118 A | 9/2013 |
| WO | 2010/044772 A1 | 4/2010 |
| WO | 2013/069973 A1 | 5/2013 |
| WO | 2014/082768 A1 | 6/2014 |

OTHER PUBLICATIONS

Milewski, J., et al., "The control strategy for a Solid Oxide Fuel Cell Hybrid System," IEEE International Conference on Control and Automation, pp. 1635-1640 (Dec. 9-11, 2009).

Hawkins, G. B., "The Theory and Practice of Steam Reforming," GBH Enterprises Ltd. p. 1-79 (Jul. 29, 2013).

Spivey, B. J., et al., "Constrained control and optimization of tubular solid oxide fuel cells for extending cell lifetime," American Control Conference (ACC), 2012, pp. 1356-1361 (Jun. 27-29, 2012).

Extended European Search Report and Opinion issued in connection with corresponding EP Application No. 16202588.6 dated May 12, 2017.

Office Action issued in Chinese App. No. 201510962881.X (dated 2019).

* cited by examiner

FUEL CELL SYSTEM, OPERATING METHOD THEREOF AND FUEL CELL POWER PLANT

BACKGROUND

This disclosure relates generally to the fuel cell field, and more particularly to a fuel cell system, a method of operating the fuel cell system and a fuel cell power plant.

Fuel cells are electro-chemical devices which can convert chemical energy from a fuel into electrical energy through an electro-chemical reaction of the fuel, such as hydrogen, with an oxidizer, such as oxygen contained in the atmospheric air. Fuel cell systems are being widely developed as an energy supply system because fuel cells are environmentally superior and highly efficient.

In the fuel cell systems, carbon may occur if a carbon formation rate is faster than a carbon removal rate. Carbon deposition is a severe problem. Carbon may occupy an anode of the fuel cell and reformer catalyst, which leads to catalyst breakage and deactivation, and downstream overheating. In extreme cases, carbon deposition may also result in pressure drop increase and forced shut down, thereby interrupting production of electricity and increasing maintenance costs of the fuel cell systems.

A steam to carbon ratio (SCR) is a key factor for evaluating performance and reliability of the fuel cell systems. The SCR is a ratio of water steam content to carbon monoxide content and methane content. If the SCR is too high, it may reduce optimum cell voltage, accelerate cell voltage degradation, deteriorate anode seal, and increase pressure drop and parasitic power consumption for anode recirculation, which lead to low electrical efficiency. In contrast, if the SCR is too low, it may lead to carbon formation and deposition in a reformer and an anode of the fuel cell, reduce efficiency and lifetime of the fuel cell system, and may even lead to shut down of the fuel cell system.

Thus, tight control of the SCR may play an important role in preventing carbon deposition. However, in the fuel cell systems, it is difficult to measure CO content, $CH_4$ content and $H_2O$ content in real time simultaneously.

Therefore, how to obtain the SCR in real time would be a challenge in the fuel cell industry.

BRIEF DESCRIPTION

In one embodiment, the present disclosure provides a fuel cell system. The fuel cell system comprises an anode recirculation loop comprising a fuel cell stack for generating power, a flowmeter, a current sensor and a processor. The flowmeter is configured for measuring a fuel flow rate provided into the anode recirculation loop. The current sensor is configured for measuring a current drawn from the fuel cell stack. The processor is configured for determining a steam to carbon ratio in the anode recirculation loop based on the measured fuel flow rate and the measured current.

In another embodiment, the present disclosure provides a method for operating a fuel cell system which comprises an anode recirculation loop having a fuel cell stack for generating power. The method comprises supplying a fuel to the anode recirculation loop, supplying oxygen to a cathode of the fuel cell stack, measuring a fuel flow rate provided into the anode recirculation loop, measuring a current drawn from the fuel cell stack, and determining a steam to carbon ratio in the anode recirculation loop based on the measured fuel flow rate and the measured current.

In still another embodiment, the present disclosure provides a fuel cell power plant. The fuel cell power plant comprises a fuel cell system for generating power, a measuring device and a controller. The measuring device is configured for obtaining measurements of at least two operating parameters from the fuel cell system. The controller comprises an inferential measuring module having a simulation model. The simulation model defines a mapping relationship among a predominant performance index of the fuel cell system and the at least two operating parameters. The inferential measuring module is configured for determining an inferential value of the predominant performance index from the simulation model using the measurements of the at least two operating parameters.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Embodiments of the present disclosure will be described herein below with reference to the accompanying drawings. In the following description, well-known functions or constructions are not described in detail to avoid obscuring the disclosure in unnecessary detail.

Unless defined otherwise, technical and scientific terms used herein have the same meaning as is commonly understood by one of ordinary skill in the art to which this disclosure belongs. The terms "first", "second", "third" and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean either or all of the listed items. The use of "including," "comprising" or "having" and variations thereof herein are meant to encompass the items listed thereafter and equivalents thereof as well as additional items. In addition, the terms "connected" and "coupled" are not restricted to physical or mechanical connections or couplings, and can include electrical connections or couplings, whether direct or indirect.

Fuel Cell System with Anode Recirculation Loop

Figure 1:
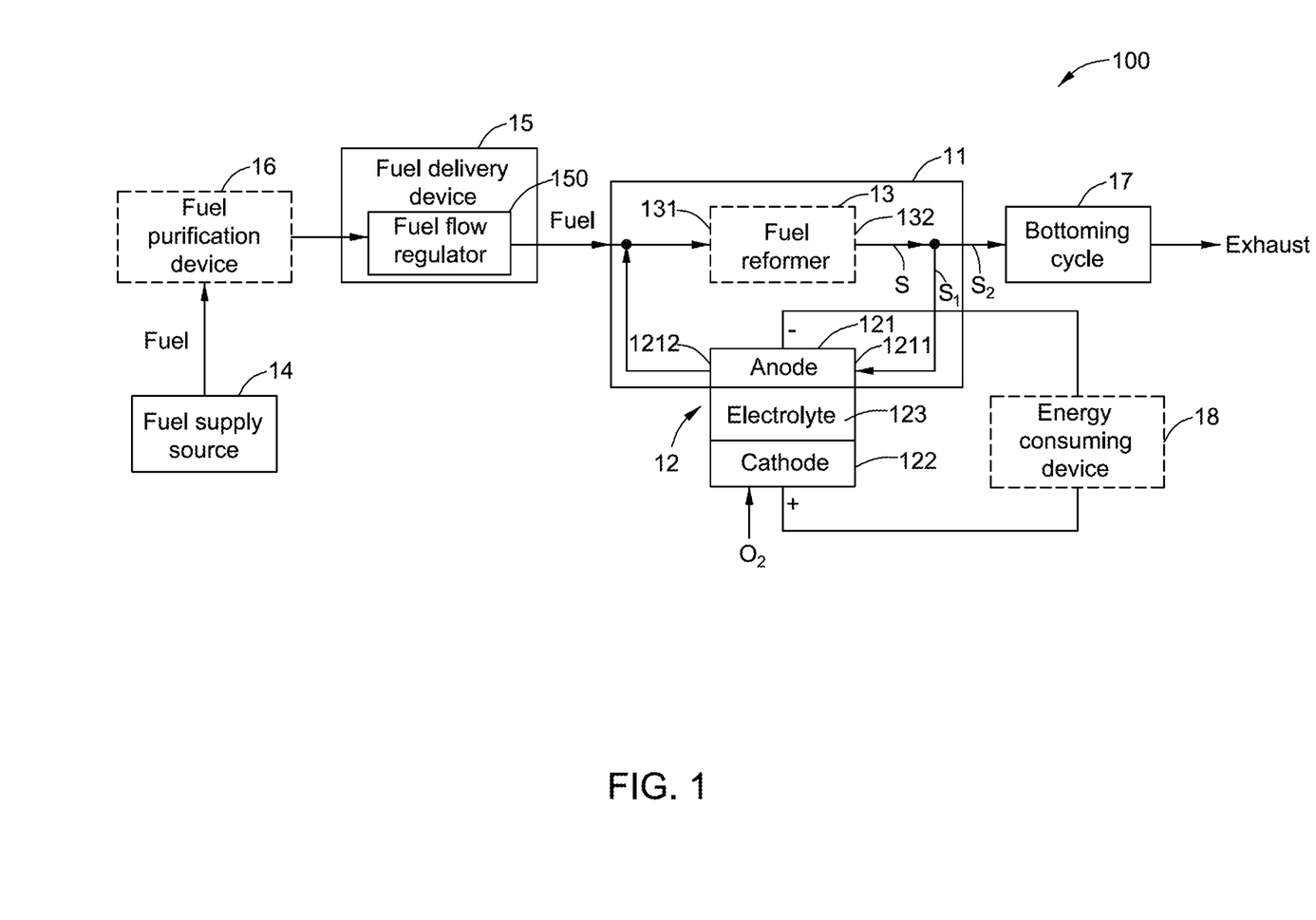
FIG. 1 is a schematic diagram of an exemplary fuel cell system with an anode recirculation loop.

FIG. 1 illustrates a schematic diagram of an exemplary fuel cell system 100. As shown in FIG. 1, the exemplary fuel cell system 100 comprises an anode recirculation loop 11. The anode recirculation loop 11 comprises a fuel cell stack 12 for generating power. The fuel cell stack 12 may include a plurality of fuel cells stacked together. The fuel cell stack 12 may be applicable for both high temperature fuel cells, such as a solid oxide fuel cell (SOFC), a molten carbonate fuel cell (MCFC) and etc., and low temperature fuel cells, such as a proton exchange membrane fuel cell (PEMFC), a direct methanol fuel cell (DMFC) and etc.

The fuel cell stack 12 comprises an anode 121, a cathode 122, and an electrolyte 123. The anode 121 of the fuel cell stack 12 has an anode inlet 1211 and an anode outlet 1212.

The anode 121 may support electrochemical reactions that generate electricity. A synthesis gas may be oxidized in the anode 121 with oxygen ions received from the cathode 122 via diffusion through the electrolyte 123. The reactions may create heat, water vapor and electricity in the form of free electrons in the anode 121, which may be used to supply power to an energy consuming device 18. The oxygen ions may be created via an oxygen reduction of a cathode oxidant using the electrons returning from the energy consuming device 18 into the cathode 122.

The energy consuming device 18 is adapted to draw an electric current from, or apply an electrical load to, the fuel cell system 100. The energy consuming device 18 may include, but should not be limited to, tools, lights or lighting assemblies, appliances (such as household or other appliances), households or other dwellings, offices or other commercial establishments, computers, signaling or communication equipment, etc.

The Cathode 122 may be coupled to a source of the cathode oxidant, such as oxygen in the atmospheric air. The cathode oxidant is defined as the oxidant that is supplied to the cathode 122 employed by the fuel cell system 100 in generating electrical power. The cathode 122 may be permeable to the oxygen ions received from the cathode oxidant.

The electrolyte 12 may be in communication with the anode 121 and the cathode 122. The electrolyte 12 may be configured to pass the oxygen ions from the cathode 122 to the anode 121, and may have little or no electrical conductivity, so as to prevent passage of the free electrons from the cathode 122 to the anode 121.

The fuel cell system 100 comprises a fuel supply device 14 for providing a fuel and a fuel delivery device 15 for delivering the fuel to the anode recirculation loop 11. The fuel may be gaseous or liquid form. Examples of such fuel may include, but are not limited to, methane, ethane, propane, biogas, natural gas, syngas, diesel, kerosene, gasoline and the like. The fuel delivery device 15 may comprise a fuel flow regulator 150 for regulating a fuel flow rate provided into the anode recirculation loop 11.

In order to decrease or remove concentration of undesirable components such as sulphur in the fuel, which is noxious and tends to bind catalysts used in the later stage of fuel reformation, the fuel cell system 100 may further comprise a fuel purification device 16. The fuel purification device 16 is configured to decrease or remove the concentration of undesirable components from the fuel. However, the fuel purification device 16 may be omitted for pure fuel, such as methane, ethane and propane, etc.

Therefore, the fuel provided into the anode recirculation loop 11 may include the fuel provided by the fuel supply device 14 or the fuel purified by the fuel purification device 16.

In one embodiment, as shown in FIG. 1, the anode recirculation loop 11 may further comprise a fuel reformer 13. The fuel reformer 13 has a reformer inlet 131 and a reformer outlet 132. The anode outlet 1212 of the fuel cell stack 12 may be coupled to the reformer inlet 131 of the fuel reformer 13, and the reformer outlet 132 of the fuel reformer 13 is returned to the anode inlet 1211 of the fuel cell stack 12 so as to form the anode recirculation loop 11.

The fuel reformer 13 may be configured to receive the fuel and a tail gas from the anode outlet 1212 of the fuel cell stack 12 and to generate a reformate S at the reformer outlet 132 from the fuel and the tail gas. The reformate S includes hydrogen ($H_2$) rich gas, and may also include carbon monoxide (CO), carbon dioxide ($CO_2$), water vapor ($H_2O$), and fuel slip, such as methane ($CH_4$). The reformate S at the reformer outlet 132 may be divided into a recirculated reformate $S_1$ and a slip reformate $S_2$. The recirculated reformate $S_1$ is recirculated back to the anode inlet 1211.

When the fuel cell system 100 is in operation, the fuel is supplied to the anode recirculation loop 11, particularly the reformer inlet 131 of the fuel reformer 13 in this embodiment, and oxygen, for example the oxygen contained in the atmospheric air, is supplied to the cathode 122 of the fuel cell stack 12. In the fuel reformer 13, the fuel may be reformed to generate hydrogen through chemical reaction. For example, for a hydrocarbon fuel, the hydrocarbon fuel is converted into carbon monoxide (CO) and hydrogen ($H_2$) by the following steam reforming reaction (1), and carbon monoxide and water vapor ($H_2O$) is converted into carbon dioxide ($CO_2$) and hydrogen by the following water gas shifting reaction (2).

$$C_nH_{2n+2} + nH_2O \leftrightharpoons nCO + (2n+1)H_2 \qquad (1)$$

$$CO + H_2O \rightarrow CO_2 + H_2 \qquad (2)$$

Though any hydrocarbon fuel could be used, it is for simplicity to use methane ($CH_4$) as an illustrative example of the fuel hereinafter. When methane ($CH_4$) is used as the fuel, the steam reforming reaction (1) above could be modified as follows:

$$CH_4 + H_2O \rightarrow CO + 3H_2 \qquad (3)$$

The recirculated reformate $S_1$ is returned to the anode inlet 1211 of the fuel cell stack 12. In the anode 121 of the fuel cell stack 12, the recirculated reformate $S_1$ and the oxygen ions from the cathode 122 are mixed, and are converted into water vapor through the following reaction (3) so as to generate power and heat.

$$2H_2 + O_2 \rightarrow 2H_2O \qquad (4)$$

In another embodiment, the fuel cell stack 12 may have internal reforming function without the separate fuel reformer 13. Under such the circumstance, the anode outlet 1212 of the fuel cell stack 12 may be directly returned to the anode inlet 1211 so as to form the anode recirculation loop 11. Thus, in the anode 121 of the fuel cell stack 12, the steam reforming reaction (1) or (3) and the water gas shifting reaction (2) above will also occur.

Continuing to refer to FIG. 1, the fuel cell system 100 may further comprise a bottoming cycle 17 including an internal combustion engine. The slip reformate $S_2$ of the reformate S is diverted to the bottoming cycle 17. The internal combustion engine is driven to generate additional electricity for providing increased efficiency of power generation in response to the slip reformate $S_2$, and a redundant portion is discharged as an exhaust from the internal combustion engine.

As discussed in more detail hereinafter, it may be desirable to control a steam to carbon ratio (SCR) in the anode recirculation loop 11, especially the SCR at the reformer inlet 131 or at the anode inlet 1211. The SCR may be defined as a ratio of water vapor content contained within a volume of a combined stream to the sum of carbon monoxide content and methane content contained within the volume. The controlling may include controlling the SCR to be approximately equal to a desired, or target, value, as well as controlling the SCR to be within a desired, or target, range. Illustrative, non-exclusive examples of the SCR according to the present disclosure may include the SCRs between 2:1 and 5:1.

Embodiment 1: SCR Prediction at Reformer Inlet

Figure 2:
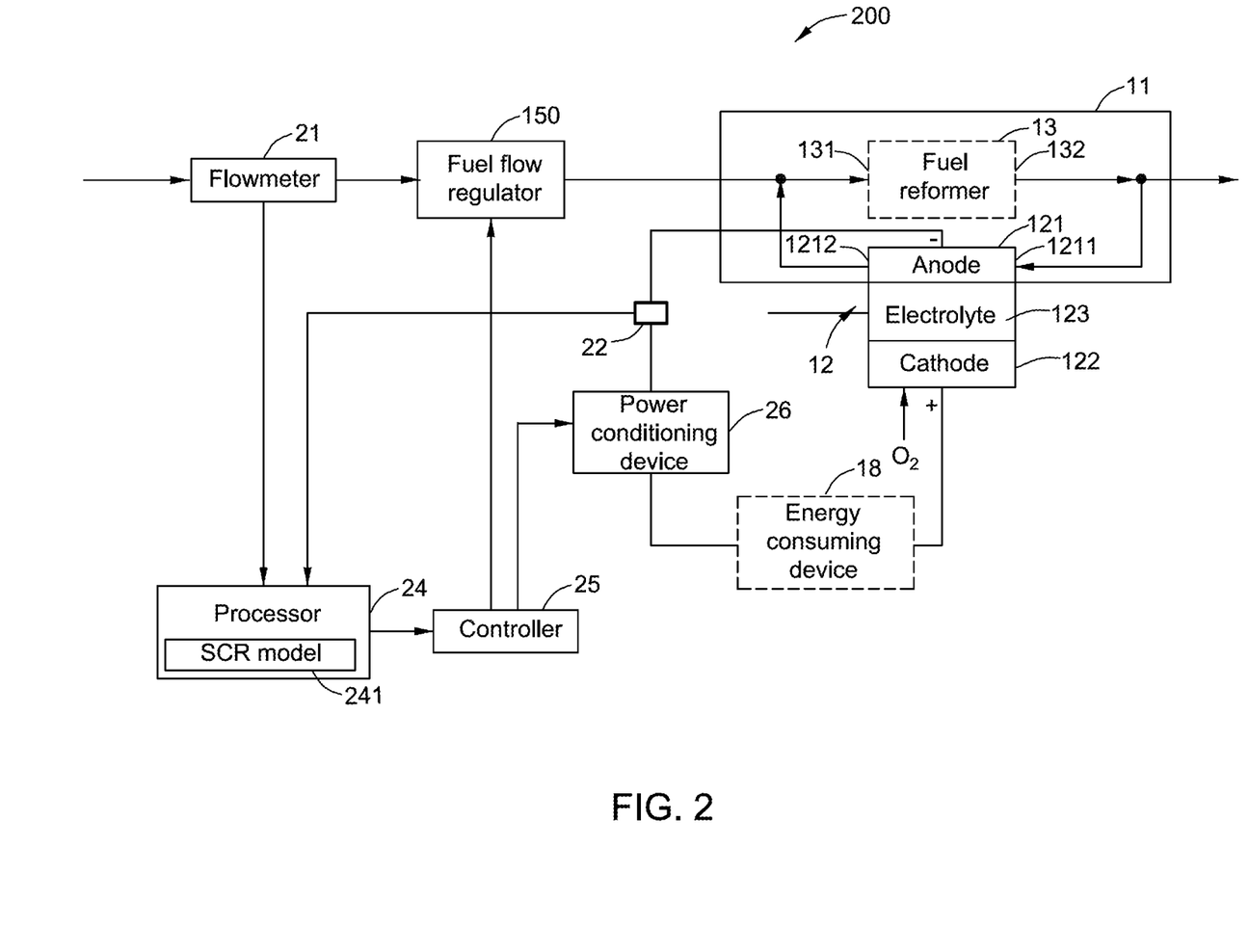
FIG. 2 is a schematic diagram of an exemplary fuel cell system in accordance with a first embodiment of the present disclosure.

FIG. 2 illustrates a schematic diagram of an exemplary fuel cell system 200 in accordance with a first embodiment of the present disclosure. With reference to FIG. 2, in comparison to FIG. 1, the fuel cell system 200 in accordance with the first embodiment of the present disclosure further comprises a flowmeter 21, a current sensor 22 and a processor 24. The flowmeter 21 is configured to measure a fuel flow rate provided into the anode recirculation loop 11. The current sensor 22 is configured to measure a current drawn from the fuel cell stack 12. The processor 24 is configured to determine a steam to carbon ratio (SCR) in the anode recirculation loop 11 in real time based on the measured fuel flow rate and the measured current. In the first embodiment, the SCR in the anode recirculation loop 11 comprises a SCR at the reformer inlet 131 of the fuel reformer 13. The processor 24 comprises a steam to carbon ratio (SCR) model 241. The SCR model 241 defines a mapping relationship among the SCR at the reformer inlet 131, and the fuel flow rate and the current. The SCR at the reformer inlet 131 may be determined from the SCR model 241 according to the measured fuel flow rate and the measured current.

As an example, the SCR model 241 comprises a linear equation as follows:

$$SCR_{est1} = A + B \times FU_{sys} = A + B \times \frac{I \times N}{8 \times F \times f_{fuel}} \quad (5)$$

Wherein $SCR_{est1}$ represents the SCR at the reformer inlet 131, A and B represents constants, $FU_{sys}$ represents a fuel utilization of the fuel cell system 200, I represents the current drawn from the fuel cell stack 12, N represents the number of the fuel cells of the fuel cell stack 12, F represents the Faraday constant (96485 C/s), and $f_{fuel}$ represents the fuel flow rate provided into the anode recirculation loop 11. In the linear equation (5), the SCR at the reformer inlet 131 is as a function of the fuel flow rate provided into the anode recirculation loop 11 and the current drawn from the fuel cell stack 12.

According to a lot of simulation testing data, the linear equation (5) above may be approximately expressed as the following equation:

$$SCR_{est1} \approx -8.08 + 17.2 \times FU_{sys} = -8.08 + 17.2 \times \frac{I \times N}{8 \times F \times f_{fuel}} \quad (6)$$

Therefore, as long as the fuel flow rate $f_{fuel}$ and the current I are measured, the steam to carbon ratio $SCR_{est1}$ at the reformer inlet 131 can be easily estimated according to the linear equation (5) or (6) above.

The effectiveness of the linear equation (6) above can be demonstrated by the following comparative tests against a high fidelity first-principle computer model (see Table 1).

The testing data was generated in the fuel cell system 200 by varying a temperature T of the fuel cell stack 12 (i.e. a temperature at the anode outlet 1212), a recycle ratio RR (which is a flow rate ratio of the recirculated reformate $S_1$ to the reformate S), the current I drawn from the fuel cell stack 12 and the methane flow rate $f_{CH_4}$ provided into the reformer inlet 131 of the anode recirculation loop 11.

TABLE 1

| T (° C.) | RR | I (Amps) | $f_{CH_4}$ (mol/s) | $SCR_{sim1}$ | $SCR_{est1}$ | RE (%) |
|---|---|---|---|---|---|---|
| 750 | 0.77 | 99.3 | 0.132 | 3.10 | 2.99 | −3.6 |
| 750 | 0.77 | 105 | 0.132 | 3.81 | 3.62 | −4.9 |
| 750 | 0.8 | 129 | 0.174 | 2.85 | 2.85 | 0.1 |
| 750 | 0.8 | 138 | 0.174 | 3.63 | 3.61 | −0.6 |
| 750 | 0.82 | 129 | 0.174 | 2.78 | 2.85 | 2.3 |
| 750 | 0.82 | 143 | 0.174 | 4.08 | 4.03 | −1.2 |
| 800 | 0.77 | 92.2 | 0.132 | 2.24 | 2.20 | −1.8 |
| 800 | 0.8 | 129 | 0.174 | 2.80 | 2.85 | 1.8 |
| 800 | 0.8 | 138 | 0.174 | 3.57 | 3.61 | 1.1 |
| 800 | 0.82 | 129 | 0.174 | 2.72 | 2.85 | 4.5 |
| 800 | 0.82 | 143 | 0.174 | 4.01 | 4.03 | 0.6 |
| 850 | 0.77 | 99.3 | 0.132 | 2.99 | 2.99 | −0.2 |
| 850 | 0.77 | 105 | 0.132 | 3.70 | 3.62 | −2.0 |
| 850 | 0.8 | 138 | 0.174 | 3.50 | 3.61 | 3.2 |
| 850 | 0.8 | 145 | 0.174 | 4.29 | 4.20 | −2.1 |
| 850 | 0.82 | 143 | 0.174 | 3.92 | 4.03 | 2.8 |
| 850 | 0.82 | 150 | 0.174 | 4.85 | 4.63 | −4.7 |

Wherein $SCR_{sim1}$ represents a simulated SCR at the reformer inlet 131 from the high fidelity first-principle computer model, $SCR_{est1}$ represents an estimated SCR at the reformer inlet 131 from the linear equation (6), and RE represents a relative error between the estimated steam to carbon ratio $SCR_{est1}$ and the simulated steam to carbon ratio $SCR_{sim1}$. From Table 1 above, the average absolute relative error is 2.2%, while the maximal absolute relative error is 4.9% which is below an engineering standard error (for example 5%) in the fuel cell industry. Thus, the comparative result indicates that the prediction from the linear equation (6) may agree well with the result from the high fidelity first-principle computer model.

Continuing to refer to FIG. 2, in order to make better use of the determined steam to carbon ratio to prevent carbon deposition in the fuel cell system 200, the fuel cell system 200 may further comprise a controller 25. The controller 25 is configured to control performance of the fuel cell system 200 based on the determined steam to carbon ratio. A steam to carbon ratio limit may be pre-stored in the controller 25.

Controlling the performance of the fuel cell system 200 may include adjusting the performance of the fuel cell system 200.

For example, in one embodiment, when the determined steam to carbon ratio is close to the steam to carbon ratio limit, the controller 25 may send an adjusting command to the fuel flow regulator 150 of the fuel cell system 200. The fuel flow regulator 150 may regulate the fuel flow rate provided into the anode recirculation loop 11 in response to the adjusting command so as to control the steam to carbon ratio.

In another embodiment, the fuel cell system 200 of the present disclosure may further comprise a power conditioning device 26. The power conditioning device 26 may be used to connect the fuel cell stack 12 to the energy consuming device 18. When the determined steam to carbon ratio is close to the steam to carbon ratio limit, the controller 25 may send an adjusting command to the power conditioning device 26. The power conditioning device 26 may adjust the current drawn from the fuel cell stack 12 in response to the adjusting command so as to control the steam to carbon ratio. For example, the power conditioning device 26 may include a DC-DC converter, a DC-AC inverter, or the combination of the DC-DC converter and DC-AC inverter.

In still another embodiment, when the determined steam to carbon ratio is close to the steam to carbon ratio limit, the controller 25 may send adjusting commands to the fuel flow regulator 150 and the power conditioning device 26 respectively. The fuel flow regulator 150 and the power conditioning device 26 may regulate the fuel flow rate provided into the anode recirculation loop 11 and adjust the current drawn from the fuel cell stack 12 in response to the individual adjusting commands so as to cooperatively control the steam to carbon ratio.

Certainly, controlling the performance of the fuel cell system 200 may also include only monitoring the performance of the fuel cell system 200. For example, when the determined steam to carbon ratio is close to the steam to carbon ratio limit, the controller 25 may only generate a warning signal in an operator interface (for example, human machine interface) or send a notification via an email or text message to a system operator, so as to inform the system operator to take actions to control the steam to carbon ratio.

The controller 25 of the present disclosure may be a multi-core controller 25. The processor 24 may be integrated into the controller 25.

The fuel cell system 200 of the present disclosure may estimate the steam to carbon ratio using fuel flow rate provided into the anode recirculation loop and the current drawn from the fuel cell stack easily and in real time. Furthermore, the fuel cell system 200 of the present disclosure may control the performance of the system 200 according to the estimated the steam to carbon ratio, so carbon deposition of the fuel cell system 200 may be effectively prevented. The real time determined steam to carbon ratio of the present disclosure may improve observability of operation and improve device performance during operation without using additional expensive gas analyzer or separation process, which enables the fuel cell system 200 of the present disclosure to have high reliability and flexibility, and low operating cost.

Embodiment 2: SCR Prediction at Anode Inlet

Figure 3:
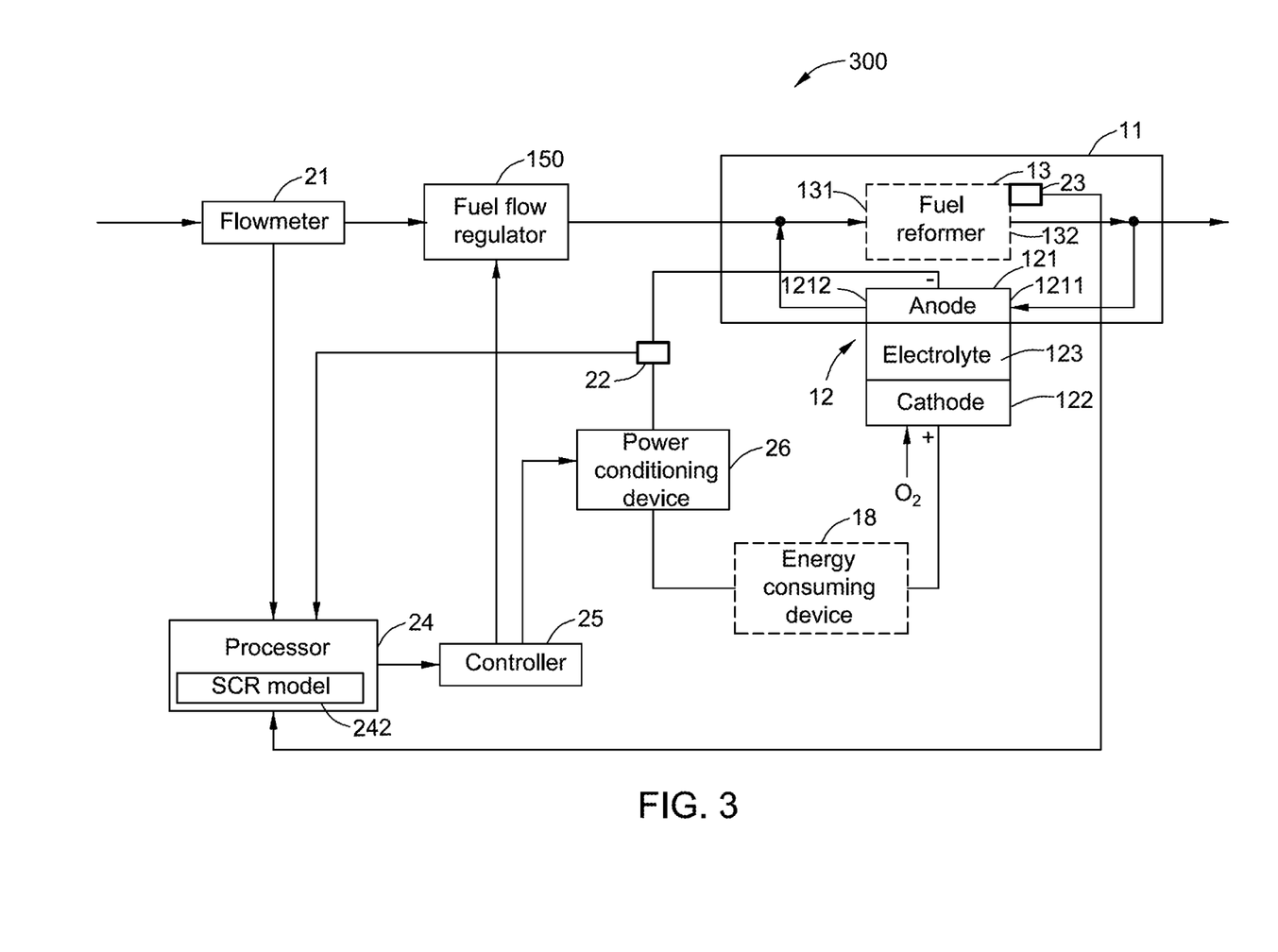
FIG. 3 is a schematic diagram of an exemplary fuel cell system in accordance with a second embodiment of the present disclosure.

FIG. 3 illustrates a schematic diagram of an exemplary fuel cell system 300 in accordance with a second embodiment of the present disclosure. With reference to FIG. 3, in comparison to the fuel cell system 200 of the first embodiment shown in FIG. 2, the fuel cell system 300 in accordance with the second embodiment of the present disclosure may further comprise a temperature sensor 23. The temperature sensor 23 is configured to measure a temperature in the anode recirculation loop 11. The processor 24 may determine the steam to carbon ratio further based on the measured temperature. That is to say, the steam to carbon ratio may be determined based on the measured fuel flow rate, the measured current and the measured temperature.

Similar to the first embodiment, the processor 24 also comprises a steam to carbon ratio model 242. But different from the first embodiment, the steam to carbon ratio model 242 of the second embodiment defines a mapping relationship among the steam to carbon ratio and the fuel flow rate, the current and the temperature. The steam to carbon ratio may be determined from the steam to carbon ratio model 242 according to the measured fuel flow rate, the measured current and the measured temperature.

In the second embodiment, the steam to carbon ratio in the anode recirculation loop 11 comprises a steam to carbon ratio at the anode inlet 1211. The temperature sensor 23 is configured to measuring a temperature at the reformer outlet 132 of the fuel reformer 13. The temperature sensor 23 may be disposed closely to the reformer outlet 132. Preferably, the temperature sensor 23 may be disposed at an end of the fuel reformer 13. More preferably, the temperature sensor 23 is at an end of catalyst bed of the fuel reformer 13. The temperature in the anode recirculation loop 11 comprises the temperature at the reformer outlet 132 of the fuel reformer 13. The steam to carbon ratio at the anode inlet 1211 may be determined using the measured fuel flow rate, the measured current and the measured temperature at the reformer outlet 132.

As an example, the steam to carbon ratio model 242 comprises a set of non-linear equations as follows based on law of species balance and equilibrium equations:

$$\dot{m}_o X_{CO_2} = \frac{I}{771880} + b \tag{7}$$

$$\dot{m}_o X_{H_2} = 3a + b \tag{8}$$

$$\dot{m}_o X_{H_2O} = \frac{I}{385940} - a - b \tag{9}$$

$$\dot{m}_o X_{CH_4} = \dot{m}_{CH_4} - \frac{I}{771880} - a \tag{10}$$

$$\dot{m}_o X_{CO} = a - b \tag{11}$$

$$\dot{m}_o = \dot{m}_{CH_4} + \frac{I}{385940} \tag{12}$$

$$\frac{X_{H_2}^3 X_{CO}}{X_{CH_4} X_{H_2O}} = e^{(AS+TS/T_o)} \tag{13}$$

$$\frac{X_{H_2} X_{CO_2}}{X_{CO} X_{H_2O}} = e^{(AW+TW/T_o)} \tag{14}$$

Wherein AS, TS, AW, TW represent equilibrium constants for the reforming reaction (3) and the shifting reaction (2) above, which have been disclosed by many researchers in the literature, as shown in Table 2.

TABLE 2

| Values of equilibrium constants of reforming and shifting reactions | |
|---|---|
| AS | 30.37 |
| TS | −27087 |
| AW | −3.911 |
| TW | 4234 |

There are eight unknown variables in the equations (7)-(14) above. Wherein a and b represent respective molar flow rates of reacted $CH_4$ in the reaction (3) and reacted CO in the reaction (2), $\dot{m}_o$ represent a total molar flow rate of the slip reformate $S_2$, $X_{CO_2}$ represents a molar fraction of $CO_2$ in the reformate S, $X_{H_2}$ represents a molar fraction of $H_2$ in the reformate S, $X_{H_2O}$ represents a molar fraction of $H_2O$ in the reformate S; $X_{CH_4}$ represents a molar fraction of $CH_4$ in the reformate S; $X_{CO}$ represents a molar fraction of CO in the reformate S.

In addition, in the equations (7)-(14) above, I represents the current drawn from the fuel cell stack 12 with unit of Ampere, $\dot{m}_{CH_4}$ represents a molar flow rate of fuel (for example, $CH_4$) provided into the anode recirculation loop 11 with unit of mole/s, and $T_o$ represents the temperature at the reformer outlet 132 with unit of Kalvin.

Therefore, once we feed in the measured fuel flow rate $f_{CH_4}$ ($f_{CH_4}$=the measured current I and the measured temperature $T_o$ at the reformer outlet 132, the eight unknown variables above can be calculated by solving the eight nonlinear equations (7)-(14) above. Thus, the steam to carbon ratio $SCR_{est2}$ at the anode inlet 1211 can be predicted by the following equation:

$$SCR_{est2} = \frac{X_{H_2O}}{X_{CH_4} + X_{CO}} \quad (15)$$

For the eight nonlinear equations (7)-(14) above, the solving algorithm could be a traditional method, such as Newton method. An alternative is to reformulate the above eight nonlinear equations (7)-(14) into a constrained optimization problem and solve the problem using any optimizing algorithm such as Steepest Descent Method, Conjugate Gradient Method, Newton's Method, Quasi-Newton Methods, Trust-Region-Reflective Method, Active-Set Method, Interior-Point Method, Nelder-Mead Simplex Method, nonlinear programming, stochastic programming, global nonlinear programming, genetic algorithms, and particle/swarm techniques.

The effectiveness of the set of nonlinear equations (7)-(14) can be demonstrated by the following comparative tests against a high fidelity first-principle computer model (see Table 3). The testing data was generated in the fuel cell system 300 by varying the temperature $T_o$ at the reformer outlet 132, the recycle ratio RR (which is a flow rate ratio of the recirculated reformate $S_1$ to the reformate S), the current I drawn from the fuel cell stack 12 and the methane flow rate $f_{CH_4}$ provided into the reformer inlet 131 of the anode recirculation loop 11.

TABLE 3

| RR | I (Amps) | $f_{CH_4}$ (mol/s) | $T_o$ (° C.) | $SCR_{sim2}$ | $SCR_{est2}$ | RE (%) |
|---|---|---|---|---|---|---|
| 0.71 | 71 | 0.091 | 511.6 | 4.299 | 4.257 | −1 |
| 0.85 | 74 | 0.095 | 609.6 | 3.306 | 3.325 | 1 |
| 0.90 | 78 | 0.100 | 663.1 | 3.033 | 2.957 | −2 |
| 0.67 | 81 | 0.104 | 485.1 | 4.363 | 4.358 | 0 |
| 0.70 | 85 | 0.109 | 504.6 | 4.429 | 4.293 | −3 |
| 0.63 | 88 | 0.113 | 552.5 | 3.991 | 3.918 | −2 |
| 0.87 | 91 | 0.117 | 626.2 | 3.193 | 3.187 | 0 |
| 0.79 | 95 | 0.122 | 565.2 | 3.896 | 3.783 | −3 |
| 0.86 | 98 | 0.126 | 615.8 | 3.314 | 3.271 | −1 |
| 0.77 | 102 | 0.130 | 551.9 | 4.071 | 3.924 | −4 |
| 0.86 | 105 | 0.135 | 616.5 | 3.340 | 3.265 | −2 |
| 0.63 | 108 | 0.139 | 573.1 | 3.728 | 3.696 | −1 |
| 0.75 | 102 | 0.130 | 538.8 | 4.199 | 4.053 | −3 |
| 0.81 | 102 | 0.130 | 576.8 | 3.800 | 3.656 | −4 |
| 0.84 | 102 | 0.130 | 597.6 | 3.575 | 3.438 | −4 |

Wherein $SCR_{sim2}$ represents a simulated SCR at the anode inlet 1211 from the high fidelity first-principle computer model, $SCR_{est2}$ represents an estimated SCR at the anode inlet 1211 using the set of nonlinear equations (7)-(14), RE represents a relative error between the estimated steam to carbon ratio $SCR_{est2}$ and the simulated steam to carbon ratio $SCR_{sim2}$. From Table 3 above, the average absolute relative error is 2%, while the maximal absolute relative error is 4% which is also below an engineering standard error (for example 5%) in the fuel cell industry. Thus, the comparative result indicates that the prediction from the set of nonlinear equations (7)-(14) may agree well with the result from the high fidelity first-principle computer model.

The fuel cell system 300 of the present disclosure may estimate the steam to carbon ratio using fuel flow rate provided into the anode recirculation loop 11, the current drawn from the fuel cell stack 12 and the temperature in the anode recirculation loop 11 easily and in real time.

Furthermore, similar to the fuel cell system 200 of the first embodiment shown in FIG. 2, the fuel cell system 300 of the second embodiment may control the performance of the system 300 according to the estimated the steam to carbon ratio, so carbon deposition of the fuel cell system 300 may be effectively prevented.

Method for Operating Fuel Cell System

Figure 4:
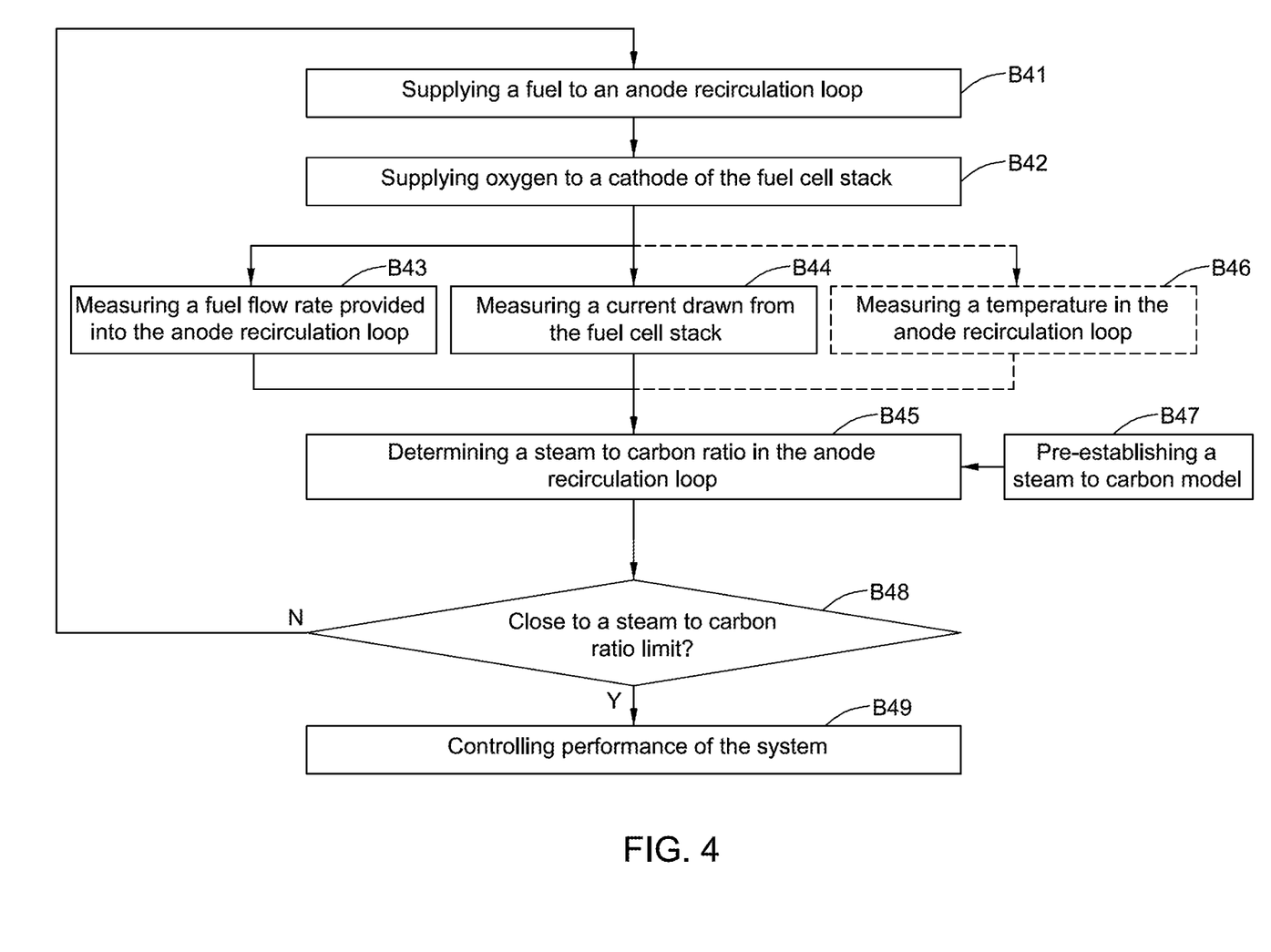
FIG. 4 is a flow chart of an exemplary method for operating a fuel cell system in accordance with an embodiment of the present disclosure.

The present disclosure further provides a method for operating the fuel cell system 200, 300. FIG. 4 illustrates a flow chart of the method for operating the fuel cell system 200, 300 in accordance with an embodiment of the present disclosure.

As shown in FIG. 4, in block B41, a fuel, for example a hydrocarbon fuel such as methane, is supplied to the anode recirculation loop 11 of the fuel cell system 200, 300. The fuel provided into the anode recirculation loop 11 in the present disclosure may include the fuel provided by a fuel supply device 14 or the fuel purified by a fuel purification device 16. In one embodiment, the anode recirculation loop 11 may further comprise a fuel reformer 13. The fuel is provided to a reformer inlet 131 of the fuel reformer 13.

In block B42, oxygen, for example the oxygen contained in the atmospheric air, is supplied to a cathode 122 of a fuel cell stack 12 of the anode recirculation loop 11. The fuel reformer 13 receives the fuel and a tail gas from an anode outlet 1212 of the fuel cell stack 12 and generates a reformate S. A recirculated reformate $S_1$ of the reformate S is then returned to an anode inlet 1211 of the fuel cell stack 12. In the anode 121 of the fuel cell stack 12, the recirculated reformate $S_1$ and the oxygen ions from the cathode 122 are mixed and are converted into water vapor so as to generate power.

In block B43, a fuel flow rate (for example, methane flow rate) provided into the anode recirculation loop 11 is measured, for example, by using a flowmeter 21.

In block B44, a current drawn from the fuel cell stack 12 is measured, for example, by using a current sensor 22.

In block B45, in one embodiment, a steam to carbon ratio in the anode recirculation loop 11 may be determined based on the measured fuel flow rate in block B43 and the measured current in block B44.

In another embodiment, the method of the present disclosure may further comprise an optional block B46. In the optional block B46, a temperature in the anode recirculation loop 11 is measured, for example, by a temperature sensor 23. Under such the circumstance, in block B45, the steam to carbon ratio in the anode recirculation loop 11 may be determined based on the measured fuel flow rate in block B43, the measured current in block B44 and the measured temperature in block B46. As an example, the temperature in the anode recirculation loop 11 in block B46 may comprise a temperature at a reformer outlet 132 of the fuel reformer 13.

In block B47, a steam to carbon ratio model 241, 242 may be pre-established. In one embodiment, the steam to carbon ratio model 241 defines a mapping relationship among the steam to carbon ratio at the reformer inlet 131, and the fuel flow rate provided into the anode recirculation loop 11 and the current drawn from the fuel cell stack 12. In block B45, the steam to carbon ratio in the anode recirculation loop 11, in particular a steam to carbon ratio at the reformer inlet 131 may be determined from the steam to carbon ratio model 241 in block B47 according to the measured fuel flow rate in block B43 and the measured current in block B44. In another embodiment, the steam to carbon ratio model 242 defines a mapping relationship among the steam to carbon ratio in the anode recirculation loop 11 and the fuel flow rate provided into the anode recirculation loop 11, the current drawn from the fuel cell stack 12 and the temperature in the anode recirculation loop 11. In block B45, the steam to carbon ratio in the anode recirculation loop 11, in particular a steam to carbon ratio at the anode inlet 1211 may be determined from the steam to carbon ratio model 242 in block B47 using the measured fuel flow rate in block B43, the measured current in block B44 and the measured temperature in the anode recirculation loop 11 in block B46, in particular the measured temperature at the reformer outlet 132.

Block B48 determines whether the determined steam to carbon ratio is close to a steam to carbon ratio limit. When the determined steam to carbon ratio is close to the steam to carbon ratio limit, the process goes to block B49. If not, the process is returned to block B41.

In block B49, performance of the fuel cell system 200, 300 is controlled based on the determined steam to carbon ratio. In one embodiment, controlling the performance of the fuel cell system 200, 300 may include monitoring the performance of the fuel cell system 200, 300. For example, when the determined steam to carbon ratio is close to the steam to carbon ratio limit, a warning signal may be generated in an operator interface, or a notification may be sent via an email or text message to a system operator, so as to inform the system operator to take actions to control the steam to carbon ratio. In another embodiment, controlling the performance of the fuel cell system 200, 300 may include adjusting the performance of the fuel cell system 200, 300. For example, when the determined steam to carbon ratio is close to the steam to carbon ratio limit, at least one of the fuel flow rate provided into the anode recirculation loop 11 and the current drawn from the fuel cell stack 12 may be adjusted, and/or hydrogen may be also injected to the anode recirculation loop 11.

The method for operating the fuel cell system 200, 300 of the present disclosure may improve observability of operation and improve device performance during operation, which enables the fuel cell system 200, 300 of the present disclosure to have high reliability and flexibility, and have low operating cost.

Fuel Cell Power Plant

Figure 5:
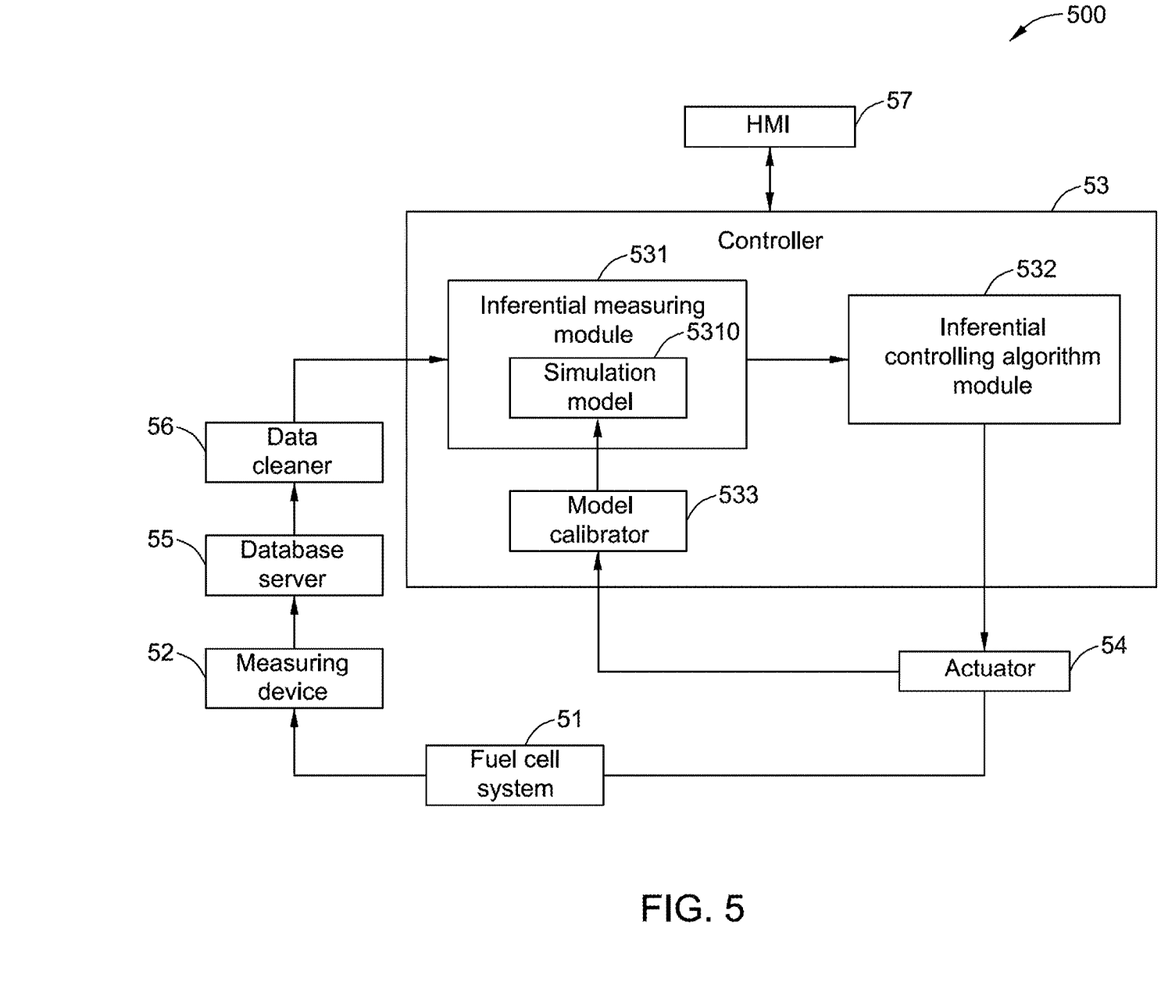
FIG. 5 is a schematic diagram of an exemplary fuel cell power plant in accordance with an embodiment of the present disclosure.

The present disclosure further provides a fuel cell power plant 500. FIG. 5 illustrates a schematic diagram of an exemplary fuel cell power plant 500 in accordance with an embodiment of the present disclosure. As shown in FIG. 5, the fuel cell power plant 500 may include a fuel cell system 51 for generating power, a measuring device 52 and a controller 53. The fuel cell system 51 may include, for example, the fuel cell system 100 of FIG. 1.

The measuring device 52 is configured to obtain measurements of at least two operating parameters from the fuel cell system 51. In one embodiment, the measuring device 52 may include, for example, the flowmeter 21 and the current sensor 22 shown in FIG. 2. Correspondingly, the measurements of the at least two operating parameters includes a measured fuel flow rate provided into an anode recirculation loop 11 of the fuel cell system 51 and a measured current drawn from a fuel cell stack 12 of the fuel cell system 51. In another embodiment, the measuring device 52 may include, for example, the flowmeter 21, the current sensor 22 and the temperature sensor 23 shown in FIG. 3. Correspondingly, the measurements of the at least two operating parameters includes the measured fuel flow rate provided into the anode recirculation loop 11 of the fuel cell system 51, the measured current drawn from the fuel cell stack 12 of the fuel cell system 51, and a measured temperature in the anode recirculation loop 11.

The controller 53 comprises an inferential measuring module 531 having a simulation model 5310. The inferential measuring module 531 may include, for example, the processor 24 shown in FIG. 2 or 3. The simulation model 5310 may include, for example, the SCR model 241, 242 shown in FIG. 2 or 3.

The simulation model 5310 defines a mapping relationship among a predominant performance index of the fuel cell system 51 and the at least two operating parameters. The inferential measuring module 531 is configured to determine an inferential value of the predominant performance index from the simulation model 5310 using the measurements of the at least two operating parameters. The predominant performance index of the fuel cell system 51 may include, for example, the steam to carbon ratio mentioned in the first or the second embodiments above. In one embodiment, the at least two operating parameters includes the fuel flow rate provided into the anode recirculation loop 11 of the fuel cell system 51, and the current drawn from the fuel cell stack 12 of the fuel cell system 51. In another embodiment, the at least two operating parameters includes the fuel flow rate provided into the anode recirculation loop 11 of the fuel cell system 51, the current drawn from the fuel cell stack 12 of the fuel cell system 51, and the temperature in the anode recirculation loop 11.

The controller 53 of the present disclosure may be a multi-core controller. The controller 53 may further comprise an inferential controlling algorithm module 532. The inferential controlling algorithm module 532 is configured to determine one or more to-be-adjusted parameters of the fuel cell system 51 based on the inferential value of the predominant performance index when the inferential value of the predominant performance index is close to a boundary of the predominant performance index and sending a controlling command. The one or more to-be-adjusted parameters may include, for example, the fuel flow rate provided into the anode recirculation loop 11, the current drawn from the fuel cell stack 12, hydrogen injected to the anode recirculation loop 11, or combination thereof. The boundary of the predominant performance index may include, for example, a steam to carbon ratio limit.

The fuel cell power plant 500 of the present disclosure may comprise one or more actuators 54. The one or more actuators 54 are configured to adjust the one or more to-be-adjusted parameters in response to the controlling command. The one or more actuators 54 may include, for example, the fuel flow regulator 150 shown in FIG. 2 or 3, the power conditioning device 26 shown in FIG. 2 or 3, or combination thereof.

The fuel cell plant 500 of the present disclosure may be applied for estimation and control of the SCR. By taking the SCR as an example above, the structures of individual functional modules of the fuel cell plant 500 are described in detail. However, the fuel cell plant 500 of the present disclosure should be not limited to the SCR, and it should be applied for estimation and control of other predominant performance index of the fuel cell plant 500 which is difficult to measure in real time using existing sensors, such as species fraction, stream characteristics (Low heat value, density, dew point, etc).

Continuing to refer to FIG. 5, in order to ensure the simulation model 5310 to follow change of the fuel cell power plant 500 due to the one or more to-be-adjusted parameters, the controller 53 of the fuel cell power plant 500 of the present disclosure may further comprise a model calibrator 533. The model calibrator 533 is configured to timely calibrate the mapping relationship of the simulation model 5310.

The fuel cell power plant 500 of the present disclosure may further comprise a database server 55 and a data cleaner 56. The database server 55 is configured to store the measurements of the at least two operating parameters from the fuel cell system 51. The data cleaner 56 is configured to clean up abnormal measurements from the measurements so as to ensure reliability of the measurements. The data cleaner 56 is coupled to the inferential measuring module 531 of the controller 53.

The fuel cell power plant 500 of the present disclosure may further comprise a human machine interface 57. The human machine interface 57 is communicated with the controller 53 and with a plant operator or supervisory controller.

The fuel cell power plant 500 of the present disclosure may improve observability of operation and improve device performance during operation. The fuel cell power plant 500 of the present disclosure may have high reliability and flexibility, and have low operating cost.

While steps of the methods for operating the fuel cell system 200, 300 in accordance with embodiments of the present disclosure are illustrated as functional blocks, the order of the blocks and the separation of the steps among the various blocks shown in FIG. 4 are not intended to be limiting. For example, the blocks may be performed in a different order and a step associated with one block may be combined with one or more other blocks or may be subdivided into a number of blocks.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the following claims.

What is claimed is:

1. A fuel cell system comprising:
    an anode recirculation loop comprising a fuel cell stack for generating power,
    a flowmeter for measuring a fuel flow rate provided into the anode recirculation loop;
    a current sensor for measuring a current drawn from the fuel cell stack; and
    a processor for determining a steam to carbon ratio in the anode recirculation loop in real time based on a steam to carbon ratio model that defines a mapping relationship among the steam to carbon ratio at the reformer inlet, the measured fuel flow rate, and the measured current,
    wherein the steam to carbon ratio is at least 2.72:1.

2. The fuel cell system of claim 1, wherein the steam to carbon ratio model comprises a linear equation in which the steam to carbon ratio at the reformer inlet is as a function of the fuel flow rate and the current.

3. The fuel cell system of claim 1, further comprising:
    a temperature sensor for measuring a temperature in the anode recirculation loop, wherein the processor is configured for determining the steam to carbon ratio further based on the measured temperature.

4. The fuel cell system of claim 3, wherein the processor comprises a steam to carbon ratio model which defines a mapping relationship among the steam to carbon ratio and the fuel flow rate, the current and the temperature.

5. The fuel cell system of claim 4, wherein the steam to carbon ratio in the anode recirculation loop comprises a steam to carbon ratio at the anode inlet, and the temperature in the anode recirculation loop comprises a temperature at a reformer outlet of the fuel reformer.

6. The fuel cell system of claim 5, wherein the steam to carbon ratio model comprises a set of nonlinear equations, and the steam to carbon ratio at the anode inlet is determined using the measured fuel flow rate, the measured current and the measured temperature at the reformer outlet according to the set of nonlinear equations.

7. The fuel cell system of claim 1, further comprising:
    a controller for controlling performance of the system based on the determined steam to carbon ratio.

8. The fuel cell system of claim 7, further comprising a fuel flow regulator, wherein when the determined steam to carbon ratio is close to a steam to carbon ratio limit, the controller sends an adjusting command to the fuel flow regulator, and the fuel flow regulator regulates the fuel flow rate provided into the anode recirculation loop in response to the adjusting command.

9. The fuel cell system of claim 7, further comprising a power conditioning device, wherein when the determined steam to carbon ratio is close to a steam to carbon ratio limit, the controller sends an adjusting command to the power conditioning device, and the power conditioning device adjusts the current drawn from the fuel cell stack in response to the adjusting command.

10. A method for operating a fuel cell system of claim 1, wherein the method comprises:
    supplying a fuel to the anode recirculation loop;
    supplying oxygen to a cathode of the fuel cell stack;
    measuring a fuel flow rate provided into the anode recirculation loop;
    measuring a current drawn from the fuel cell stack; and
    determining the steam to carbon ratio in the anode recirculation loop based on the measured fuel flow rate and the measured current.

11. The method of claim 10, further comprising:
    pre-establishing a steam to carbon ratio model, wherein the steam to carbon ratio model defines a mapping relationship among the steam to carbon ratio, and the fuel flow rate and the current.

12. The method of claim 10, further comprising:
    measuring a temperature in the anode recirculation loop, wherein the steam to carbon ratio is determined further based on the measured temperature.

13. The method of claim 12, further comprising:
    pre-establishing a steam to carbon ratio model, wherein the steam to carbon ratio model defines a mapping relationship among the steam to carbon ratio and the fuel flow rate, the current and the temperature.

14. The method of claim 10, further comprising:
    controlling performance of the system based on the determined steam to carbon ratio.

15. The method of claim 14, further comprising:
generating a warning signal and sending a notification when the determined steam to carbon ratio is close to a steam to carbon ratio limit; or
adjusting at least one of the fuel flow rate provided into the anode recirculation loop and the current drawn from the fuel cell stack or injecting hydrogen to the anode recirculation loop when the determined steam to carbon ratio is close to the steam to carbon ratio limit.

16. The fuel cell system of claim 1, wherein the fuel cell stack comprises an anode having an anode inlet and an anode outlet, a cathode, and the anode recirculation loop further comprises:
a fuel reformer for receiving fuel and a tail gas from the anode outlet of the fuel cell stack and
a reformate, wherein at least one portion of the reformate is returned to the anode inlet of the fuel cell stack and the fuel cell stack is configured for generating power with oxygen supplied to the cathode.

17. The fuel cell system of claim 1, wherein the steam to carbon ratio is at least 2.80:1.

18. The fuel cell system of claim 1, wherein the real time determination of the steam to carbon ratio provides improvements to the fuel cell systems selected from the group consisting of improved observability of operations, improved device performance during operations, improved reliability, improved flexibility, lower operation costs, and effective prevention of carbon deposition.

19. The fuel cell system of claim 18, wherein the improved device performance occurs without using gas analyzers or a separation process.

20. The fuel cell system of claim 1, wherein the steam to carbon ratio ranges from 2.72:1 to 4.85:1.

21. The fuel cell system of claim 7, wherein the controller is configured to control performance of the fuel cell system based on the determined steam to carbon ratio in real time to prevent carbon deposition in the fuel cell system.

22. The fuel cell system of claim 10, wherein the real time determination of the steam to carbon ratio effectively prevents carbon deposition of the fuel cell system.

* * * * *